(12) United States Patent
Rached et al.

(10) Patent No.: US 9,028,706 B2
(45) Date of Patent: *May 12, 2015

(54) BINARY COMPOSITIONS OF 2,3,3,3-TETRAFLUOROPROPENE AND OF AMMONIA

(71) Applicant: Arkema France, Colombes (FR)

(72) Inventors: Wissam Rached, Chaponost (FR); Jean-Christophe Boutier, Oullins (FR)

(73) Assignee: Arkema France, Colombes (FR)

( * ) Notice: Subject to any disclaimer, the term of this patent is extended or adjusted under 35 U.S.C. 154(b) by 28 days.

This patent is subject to a terminal disclaimer.

(21) Appl. No.: 14/023,871

(22) Filed: Sep. 11, 2013

(65) Prior Publication Data

US 2014/0008565 A1    Jan. 9, 2014

Related U.S. Application Data

(62) Division of application No. 13/178,955, filed on Jul. 8, 2011, now Pat. No. 8,557,135.

(30) Foreign Application Priority Data

Feb. 10, 2011    (FR) ...................... 11 51077

(51) Int. Cl.
| | | |
|---|---|---|
| *C09K 5/04* | (2006.01) | |
| *C08J 9/14* | (2006.01) | |
| *C09K 3/30* | (2006.01) | |
| *C11D 7/28* | (2006.01) | |
| *C11D 7/50* | (2006.01) | |

(52) U.S. Cl.
CPC ............... *C09K 5/045* (2013.01); *C08J 9/149* (2013.01); *C09K 3/30* (2013.01); *C09K 2205/126* (2013.01); *C09K 2205/132* (2013.01); *C11D 7/28* (2013.01); *C11D 7/5018* (2013.01); *C11D 7/5068* (2013.01)

(58) Field of Classification Search
CPC ............ C09K 5/045; C09K 2205/122; C09K 2205/32
See application file for complete search history.

(56) References Cited

U.S. PATENT DOCUMENTS

| | | | |
|---|---|---|---|
| 4,755,316 A | 7/1988 | Magid et al. | |
| 4,971,712 A | 11/1990 | Gorski et al. | |
| 4,975,212 A | 12/1990 | Thomas et al. | |
| 5,008,028 A | 4/1991 | Jolley et al. | |
| 5,595,678 A | 1/1997 | Short et al. | |
| 8,070,977 B2 | 12/2011 | Rached | |
| 8,075,798 B2 | 12/2011 | Rached | |

(Continued)

FOREIGN PATENT DOCUMENTS

| | | |
|---|---|---|
| CN | 101827912 A | 9/2010 |
| EP | 0 490 810 A1 | 6/1992 |

(Continued)

OTHER PUBLICATIONS

U.S. Appl. No. 14/371,118, Boussand.

(Continued)

*Primary Examiner* — John Hardee
(74) *Attorney, Agent, or Firm* — Buchanan Ingersoll & Rooney P.C.

(57) ABSTRACT

A binary composition of 2,3,3,3-tetrafluoropropene and of ammonia, and also to the use thereof, in particular as a heat transfer fluid.

20 Claims, 1 Drawing Sheet

(56) References Cited

U.S. PATENT DOCUMENTS

| | | |
|---|---|---|
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,825 B2 | 10/2014 | Guerin et al. |
| 2004/0089839 A1 | 5/2004 | Thomas et al. |
| 2006/0243945 A1 | 11/2006 | Minor et al. |
| 2009/0241562 A1 | 10/2009 | Thomas et al. |
| 2009/0302264 A1 | 12/2009 | Serrano et al. |
| 2011/0084228 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2011/0288192 A1 | 11/2011 | Van Horn |
| 2012/0049104 A1 | 3/2012 | Rached |
| 2012/0056123 A1 | 3/2012 | Rached |
| 2012/0068105 A1 | 3/2012 | Rached et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2013/0105724 A1 | 5/2013 | Boussand |
| 2013/0186114 A1 | 7/2013 | Guerin et al. |
| 2014/0075969 A1 | 3/2014 | Guerin et al. |
| 2014/0318160 A1 | 10/2014 | Rached |
| 2014/0326017 A1 | 11/2014 | Rached |

FOREIGN PATENT DOCUMENTS

| | | |
|---|---|---|
| EP | 0 699 737 A2 | 3/1996 |
| EP | 2 487 216 A1 | 8/2012 |
| WO | WO 2004/037913 A2 | 5/2004 |
| WO | WO 2004/037913 A3 | 5/2004 |
| WO | WO 2005/042663 A1 | 5/2005 |
| WO | WO 2006/094303 A2 | 9/2006 |
| WO | WO 2006/094303 A3 | 9/2006 |
| WO | WO 2007/126414 A2 | 11/2007 |
| WO | WO 2008/009922 A2 | 1/2008 |
| WO | WO 2008/009928 A2 | 1/2008 |
| WO | WO 2008/027555 A2 | 3/2008 |
| WO | WO 2008/027555 A3 | 3/2008 |

OTHER PUBLICATIONS

Rapport de Recherche Préliminaire issued in FR 1151077, Sep. 19, 2011, 2 pages.

Rapport de Recherche Europeenne issued in EP 11 18 5765, May 21, 2012, 3 pages.

Bousssand, Béatrice, U.S. Appl. No. 14/371,118 entitled "Heat Transfer Compositions Having Improved Miscibility With Lubricating Oil," filed in the U.S. Patent and Trademark Office on Jul. 8, 2014.

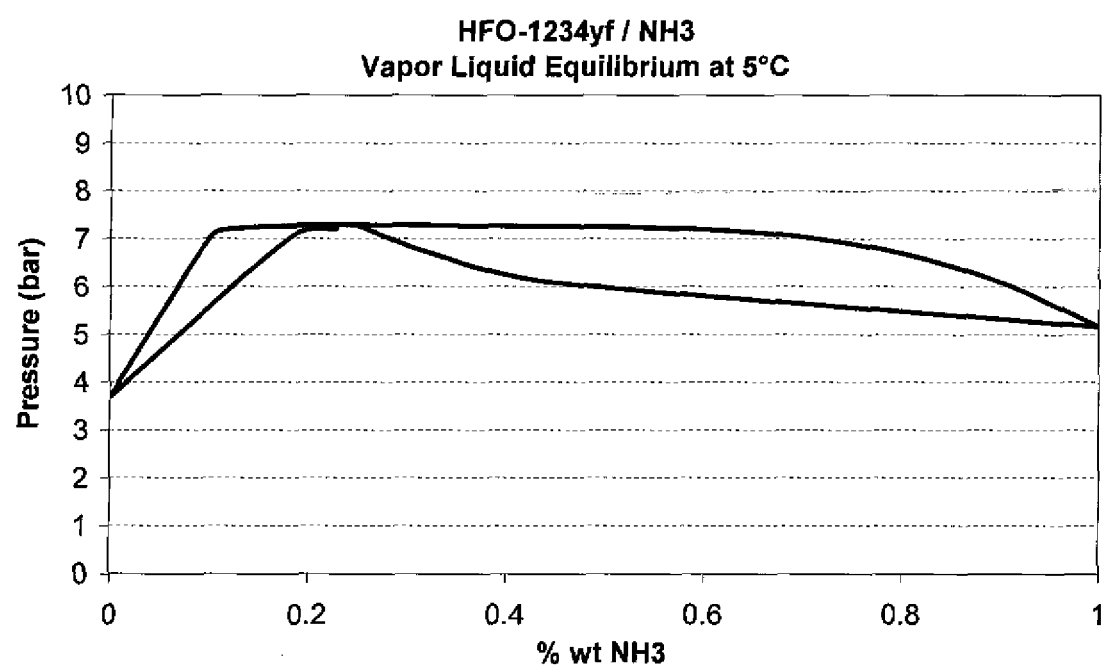

BINARY COMPOSITIONS OF 2,3,3,3-TETRAFLUOROPROPENE AND OF AMMONIA

CROSS REFERENCE TO RELATED APPLICATIONS

The present application is a divisional of U.S. application Ser. No. 13/178,955, now U.S. Pat. No. 8,557,135, filed on Jul. 8, 2011, which claims the benefit of French Application No. 11-51077, filed on Feb. 10, 2011. The entire contents of each of U.S. application Ser. No. 13/178,955 and French Application No. 11-51077 are hereby incorporated herein by reference in their entirety.

FIELD OF THE INVENTION

The present invention relates to binary compositions of 2,3,3,3-tetrafluoropropene, and to the use thereof, in particular as heat transfer fluids.

TECHNICAL BACKGROUND

Fluids based on fluorocarbon compounds are widely used in vapour compression heat transfer systems, in particular air conditioning, heat pump, refrigeration or freezing devices. These devices have in common the fact that they are based on a thermodynamic cycle comprising the vaporization of the fluid at low pressure (in which the fluid absorbs heat); the compression of the vapourized fluid up to a high pressure; the condensation of the vapourized fluid to liquid at high pressure (in which the fluid releases heat); and the expansion of the fluid in order to complete the cycle.

The choice of a heat transfer fluid (which may be a pure compound or a mixture of compounds) is dictated, on the one hand, by the thermodynamic properties of the fluid and, on the other hand, by additional constraints. Thus, one particularly important criterion is that of the impact of the fluid considered on the environment. In particular, chlorinated compounds (chlorofluorocarbons and hydrochlorofluorocarbons) have the disadvantage of damaging the ozone layer. Henceforth, generally non-chlorinated compounds such as hydrofluorocarbons, fluoroethers and fluoroolefins are therefore preferred to them.

It is however, necessary to develop other heat transfer fluids that have a global warming potential (GWP) lower than that of the heat transfer fluids currently used, and that have equivalent or improved performances.

The use of ammonia as a heat transfer fluid is known. However, a certain number of problems are associated with this compound: a very high compressor outlet temperature compared to hydrofluorocarbons; an absence of oil return and the necessity to install an oil separator; a permitted total charge that is sometimes limited due to the toxicity of the product.

Document WO 2007/126414 describes a large number of mixtures of heat transfer compounds, and in particular mixtures comprising 2,3,3,3-tetrafluoropropene (HFO-1234yf) and ammonia. The only compositions specifically disclosed in this document and that comprise these two compounds are quaternary compositions comprising two additional compounds, namely difluoromethane (HFC-32) and pentafluoroethane (HFC-125), or else HFC-32 and trifluoroiodomethane.

Document WO 2008/009928 describes heat transfer compositions based on pentafluoropropene, tetrafluoropropene and at least one additional compound, which may be ammonia.

Document WO 2008/009922 describes heat transfer compositions based on 1,2,3,3,3-pentafluoropropene (HFO-1225ye) and which may comprise, in certain embodiments, HFO-1234yf or ammonia.

Document US 2006/0243945 describes a large number of mixtures of heat transfer compounds, and in particular mixtures comprising HFO-1234yf and at least one other compound chosen from a list of compounds including ammonia. The only compositions specifically disclosed in this document and that comprise these two compounds are quaternary compositions comprising two additional compounds, namely HFC-32 and trifluoroiodomethane.

However, there is still a need to develop other heat transfer fluids that have a relatively low GWP and that are capable of replacing the customary heat transfer fluids.

In particular, it is desirable to develop other heat transfer fluids with a low GWP that are quasi-azeotropic or even azeotropic and/or which have good energy performances relative to customary heat transfer fluids (such as R404A or R410A).

SUMMARY OF THE INVENTION

The invention firstly relates to a binary composition of 2,3,3,3-tetrafluoropropene and of ammonia.

According to one embodiment, the composition comprises:
  from 1 to 60% of ammonia and from 40 to 99% of 2,3,3,3-tetrafluoropropene;
  preferably from 5 to 45% of ammonia and from 55 to 95% of 2,3,3,3-tetrafluoropropene;
  preferably from 15 to 30% of ammonia and from 70 to 85% of 2,3,3,3-tetrafluoropropene;
  preferably from 18 to 26% of ammonia and from 74 to 82% of 2,3,3,3-tetrafluoropropene;
  preferably from 21 to 23% of ammonia and from 77 to 79% of 2,3,3,3-tetrafluoropropene.

The invention also relates to the use of the composition above as a heat transfer fluid.

According to one embodiment, the composition is quasi-azeotropic, preferably is azeotropic.

The invention also relates to a heat transfer composition comprising the composition above and also one or more additives chosen from lubricants, stabilizers, surfactants, tracers, fluorescent agents, odourous agents, solubilization agents and mixtures thereof.

The invention also relates to a heat transfer system comprising a vapour compression circuit containing the composition above as a heat transfer fluid or containing the heat transfer composition above.

According to one embodiment, the system is chosen from mobile or stationary systems for heating via a heat pump, for air conditioning, for refrigeration, for freezing and from Rankine cycles, and in particular from motor vehicle air conditioning systems.

The invention also relates to a process for heating or cooling a fluid or a body by means of a vapour compression circuit containing a heat transfer fluid, said process successively comprising the evaporation of the heat transfer fluid, the compression of the heat transfer fluid, the condensation of the heat transfer fluid and the expansion of the heat transfer fluid, in which the heat transfer fluid is the composition above.

According to one embodiment, it is a process for cooling a fluid or a body, in which the temperature of the fluid or of the body cooled is from $-15°$ C. to $15°$ C., and preferably from $-10°$ C. to $10°$ C., more particularly preferably from $-5°$ C. to $5°$ C.; or a process for heating a fluid or a body, in which the temperature of the fluid or of the body heated is from 30° C. to 90° C., preferably from 35° C. to 60° C. and more particularly preferably from 40° C. to 50° C.

According to one embodiment, it is a process for cooling a fluid or a body, in which the temperature of the fluid or of the body cooled is from −40° C. to −10° C., preferably from −35° C. to −25° C. and more particularly preferably from −30° C. to −20° C.

According to one embodiment, it is a process for heating a fluid or a body, in which the temperature of the fluid or of the body heated is greater than 90° C., preferably greater than or equal to 100° C. or greater than or equal to 110° C. and preferably less than or equal to 120° C.

The invention also relates to a process for reducing the environmental impact of a heat transfer system comprising a vapour compression circuit containing an initial heat transfer fluid, said process comprising a step of replacing the initial heat transfer fluid in the vapour compression circuit with a final transfer fluid, the final transfer fluid having a GWP lower than the initial heat transfer fluid, in which the final heat transfer fluid is a composition as described above.

The invention also relates to the use of the composition above as a solvent.

The invention also relates to the use of the composition above as an expansion agent.

The invention also relates to the use of the composition above as a propellant, preferably for an aerosol.

The invention also relates to the use of the composition above as a cleaning agent.

The present invention makes it possible to meet the requirements felt in the prior art. More particularly, it provides novel compositions with low GWP that are capable of being used (inter alia) as heat transfer fluids, in particular as a replacement for customary heat transfer fluids.

In particular, the invention provides azeotropic or quasi-azeotropic compositions.

In certain embodiments, the invention provides heat transfer fluids which have good energy performances compared to customary heat transfer fluids, in particular R404A and R410A.

In certain embodiments, the compositions according to the invention exhibit, in particular, an improved volumetric capacity and/or an improved performance coefficient compared to the compositions from the prior art.

Finally, the invention makes it possible to partially or completely overcome the problems traditionally associated with ammonia and that are listed above.

BRIEF DESCRIPTION OF THE FIGURES

FIG. 1 represents the vapour/liquid equilibrium data at 5° C. of binary mixtures of HFO-1234yf and of $NH_3$, demonstrating the existence of an azeotrope and of quasi-azeotropes. The proportion of $NH_3$ between 0 and 1 (=100%) is represented on the x-axis, and the pressure in bar is represented on the y-axis.

DESCRIPTION OF EMBODIMENTS OF THE INVENTION

The invention is now described in greater detail and non-limitingly in the description which follows.

R404A denotes a mixture of 52% of 1,1,1-trifluoroethane, 44% of pentafluoroethane and 4% of 1,1,1,2-tetrafluoroethane; and R410A denotes a mixture of 50% of difluoromethane and 50% of pentafluoroethane.

Unless otherwise stated, in all of the application, the proportions of compounds indicated are given as percentages by weight.

According to the present application, the global warming potential (GWP) is defined relative to carbon dioxide and relative to a period of 100 years, according to the method indicated in "The scientific assessment of ozone depletion, 2002, a report of the World Meteorological Association's Global Ozone Research and Monitoring Project".

The expressions "heat transfer compound", respectively "heat transfer fluid" (or refrigerant fluid), are understood to mean a compound, respectively a fluid, capable of absorbing heat by evaporating at low temperature and low pressure and of releasing heat by condensing at high temperature and high pressure, in a vapour compression circuit. Generally, a heat transfer fluid may comprise one, two, three or more than three heat transfer compounds.

The expression "heat transfer composition" is understood to mean a composition comprising a heat transfer fluid and optionally one or more additives which are not heat transfer compounds for the envisaged application.

The additives may especially be chosen from lubricants, stabilizers, surfactants, tracers, fluorescent agents, odourous agents and solubilization agents.

The stabilizer or stabilizers, when they are present, preferably represent at most 5% by weight in the heat transfer composition. Among the stabilizers, mention may especially be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl, optionally fluorinated or perfluorinated, or alkenyl or aromatic epoxides) such as n-butyl glycidyl ether, hexanediol diglycidyl ether, allyl glycidyl ether, butylphenyl glycidyl ether, phosphites, phosphonates, thiols and lactones.

As lubricants, use may especially be made of oils of mineral origin, silicone oils, paraffins of natural origin, naphthenes, synthetic paraffins, alkylbenzenes, poly-α-olefins, polyalkylene glycols, polyol esters and/or polyvinyl ethers.

As tracers (capable of being detected), mention may be made of deuterated or undeuterated hydrofluorocarbons, deuterated hydrocarbons, perfluorocarbons, fluoroethers, brominated compounds, iodinated compounds, alcohols, aldehydes, ketones, nitrogen protoxide and combinations thereof. The tracer is different from the heat transfer compound(s) making up the heat transfer fluid.

As solubilization agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilization agent is different from the heat transfer compound(s) making up the heat transfer fluid.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odourous agents, mention may be made of alkyl acrylates, allyl acrylates, acrylic acids, acrylic esters, alkyl ethers, alkyl esters, alkynes, aldehydes, thiols, thioethers, disulphides, allyl isothiocyanates, alkanoic acids, amines, norbornenes, derivatives of norbornenes, cyclohexene, heterocyclic aromatic compounds, ascaridole, o-methoxy(methyl) phenol and combinations thereof.

The heat transfer process according to the invention is based on the use of a system comprising a vapour compression circuit which contains a heat transfer fluid. The heat transfer process may be a process for heating or cooling a fluid or a body.

The vapour compression circuit containing a heat transfer fluid comprises at least one evaporator, a compressor, a condenser and an expansion valve, and also lines for transporting heat transfer fluid between these components. The evaporator and the condenser comprise a heat exchanger making it possible to exchange heat between the heat transfer fluid and another fluid or body.

As a compressor, use may especially be made of a centrifugal compressor having one or more stages or a centrifugal mini-compressor. Rotary compressors, reciprocating compressors or screw compressors may also be used. The compressor may be driven by an electric motor or by a gas turbine (for example fed by the exhaust gases of a vehicle, for mobile applications), or by gearing.

The system may comprise a turbine for generating electricity (Rankine cycle).

The system may also optionally comprise at least one coolant circuit used for transmitting heat (with or without a change of state) between the heat transfer fluid circuit and the fluid or body to be heated or cooled.

The system may also optionally comprise two (or more) vapour compression circuits containing identical or different heat transfer fluids. For example, the vapour compression circuits may be coupled together.

The vapour compression circuit operates according to a conventional vapour compression cycle. The cycle comprises the change of state of the heat transfer fluid from a liquid phase (or liquid/vapour two phase state) to a vapour phase at a relatively low pressure, then the compression of the fluid in the vapour phase up to a relatively high pressure, the change of state (condensation) of the heat transfer fluid from the vapour phase to the liquid phase at a relatively high pressure, and the reduction of the pressure in order to recommence the cycle.

In the case of a cooling process, heat from the fluid or from the body that is being cooled (directly or indirectly, via a coolant) is absorbed by the heat transfer fluid, during the evaporation of the latter, at a relatively low temperature compared to the surroundings. Cooling processes include air conditioning processes (with mobile systems, for example in vehicles, or stationary systems), refrigeration processes, freezing processes or cryogenic processes.

In the case of a heating process, heat is imparted (directly or indirectly, via a coolant) from the heat transfer fluid, during the condensation thereof, to the fluid or body that is being heated, at a relatively high temperature compared to the surroundings. The system that makes it possible to implement the heat transfer is called, in this case, a "heat pump".

It is possible to use any type of heat exchanger for the implementation of the heat transfer fluids according to the invention, and in particular co-current heat exchangers or, preferably, counter-current heat exchangers.

The heat transfer fluids used within the context of the present invention are binary compositions of HFO-1234yf and of $NH_3$.

The expression "binary composition" is understood to mean a composition consisting of HFO-1234yf and $NH_3$; or a composition consisting essentially of HFO-1234yf and $NH_3$, but which may contain impurities in an amount of less than 1%, preferably less than 0.5%, preferably less than 0.1%, preferably less than 0.05% and preferably less than 0.01%.

According to particular embodiments, the proportion of HFO-1234yf in the heat transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

According to particular embodiments, the proportion of $NH_3$ in the heat transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

It may be preferable to not have too high a proportion of $NH_3$ in the mixture, in the context of use as a heat transfer fluid, in order to prevent too great a temperature increase at the outlet of the compressor.

Among the compositions above, some have the advantage of being azeotropic or quasi-azeotropic. For example, the azeotrope for the HFO-1234yf/$NH_3$ binary mixture is obtained for a proportion of $NH_3$ of around 23% (±2%), at a temperature of 5° C. (±1° C.) and at a pressure of 7.3 bar (±1 bar).

The term "quasi-azeotropic" denotes compositions for which, at constant temperature, the liquid saturation pressure and the vapour saturation pressure are almost identical (the maximum pressure difference being 10%, or even advantageously 5%, relative to the liquid saturation pressure).

For "azeotropic" compositions, at constant temperature, the maximum pressure difference is in the vicinity of 0%.

These heat transfer fluids have an advantage of ease of use. In the absence of significant temperature glide, there is no significant change in the composition circulating and no significant change either in the composition in the event of a leak.

Moreover, it has been found that certain compositions according to the invention have improved performances relative to R404A and/or R410A, in particular for moderate temperature cooling processes, that is to say those in which the temperature of the fluid or of the body cooled is from −15° C. to 15° C., preferably from −10° C. to 10° C., more particularly preferably from −5° C. to 5° C. (ideally around 0° C.). In this respect, the compositions for which the proportion of $NH_3$ is greater than or equal to 15% are particularly preferred, especially the compositions having a proportion of $NH_3$ from 15 to 30%, preferably from 18 to 26%. It has also been found that certain compositions according to the invention have improved performances relative to R410A, in particular for moderate temperature heating processes, that is to say those in which the temperature of the fluid or of the body heated is from 30° C. to 80° C., preferably from 35° C. to 55° C. and more particularly preferably from 40° C. to 50° C. (ideally around 45° C.). In this regard, the compositions for which the proportion of $NH_3$ is greater than or equal to 15% are particularly preferred, especially the compositions having a proportion of $NH_3$ of 20 to 30%.

In the "moderate temperature cooling or heating" processes mentioned above, the inlet temperature of the heat transfer fluid at the evaporator is preferably from −20° C. to 10° C., in particular from −15° C. to 5° C., more particularly preferably from −10° C. to 0° C. and for example around −5° C.; and the temperature at the beginning of the condensation of the heat transfer fluid at the condenser is preferably from 25° C. to 90° C., in particular from 30° C. to 70° C., more particularly preferably from 35° C. to 55° C. and for example around 50° C. These processes may be refrigeration, air conditioning or heating processes.

Certain compositions are also suitable for high temperature heating processes, that is to say those in which the temperature of the fluid or of the body heated is greater than 90° C., for example greater than or equal to 100° C. or greater than or equal to 110° C. and preferably less than or equal to 120° C.

It has also been found that certain compositions according to the invention have improved performances compared to R404A, in particular for low temperature refrigeration processes, that is to say those in which the temperature of the fluid or of the body cooled is from −40° C. to −10° C., and preferably from −35° C. to −25° C., more particularly preferably from −30° C. to −20° C. (ideally around −25° C.). In this regard, the compositions for which the proportion of $NH_3$ is greater than or equal to 15% are particularly preferred, especially the compositions having a proportion of $NH_3$ from 18 to 24%.

In the "low temperature refrigeration" processes mentioned above, the inlet temperature of the heat transfer fluid at the evaporator is preferably from −45° C. to −15° C., in particular from −40° C. to −20° C., more particularly preferably from −35° C. to −25° C. and for example around −30° C.; and the temperature at the beginning of the condensation of the heat transfer fluid at the condenser is preferably from 25° C. to 80° C., in particular from 30° C. to 60° C., more particularly preferably from 35° C. to 55° C. and for example around 40° C.

More generally, the compositions according to the invention may be used to replace any heat transfer fluid in any heat transfer application, and for example in motor vehicle air conditioning. For example, the compositions according to the invention may be used to replace:
- 1,1,1,2-tetrafluoroethane (R134a);
- 1,1-difluoroethane (R152a);
- 1,1,1,3,3-pentafluoropropane (R245fa);
- mixtures of pentafluoroethane (R125), 1,1,1,2-tetrafluoroethane (R134a) and isobutane (R600a), namely R422;
- chlorodifluoromethane (R22);
- the mixture of 51.2% of chloropentafluoroethane (R115) and of 48.8% of chlorodifluoromethane (R22), namely R502;
- any hydrocarbon;
- the mixture of 20% of difluoromethane (R32), 40% of pentafluoroethane (R125) and 40% of 1,1,1,2-tetrafluoroethane (R134a), namely R407A;
- the mixture of 23% of difluoromethane (R32), 25% of pentafluoroethane (R125) and 52% of 1,1,1,2-tetrafluoroethane (R134a), namely R407C;
- the mixture of 30% of difluoromethane (R32), 30% of pentafluoroethane (R125) and 40% of 1,1,1,2-tetrafluoroethane (R134a), namely R407F;
- R1234yf (2,3,3,3-tetrafluoropropene); and
- R1234ze (1,3,3,3-tetrafluoropropene).

The compositions according to the invention may also be of use as a blowing agent, a propellant (for example for an aerosol), a cleaning agent or solvent, besides their use as heat transfer fluids.

As a propellant, the compositions according to the invention may be used alone or in combination with known propellants. The propellant comprises, preferably consists of, a composition according to the invention. The active substance that has to be sprayed may be mixed with the propellant and inert compounds, solvents or other additives, in order to form a composition to be sprayed. Preferably, the composition to be sprayed is an aerosol.

As a blowing agent, the compositions according to the invention may be included in a blowing composition, which preferably comprises one or more other compounds capable of reacting and forming a foam or cellular structure under suitable conditions, as is known to a person skilled in the art.

In particular, the invention proposes a process for preparing an expanded thermoplastic product comprising firstly the preparation of a polymeric blowing composition. Typically, the polymeric blowing composition is prepared by plasticizing a polymer resin and by mixing the compounds of a blowing agent composition at an initial pressure. The plasticization of the polymer resin may be carried out under the effect of heat, by heating the polymer resin in order to soften it sufficiently in order to mix a blowing agent composition. Generally, the plasticization temperature is close to the glass transition temperature or the melting temperature for crystalline polymers.

Other uses of the compositions according to the invention include uses as solvents, cleaning agents or others. Mention may be made, for example, of vapour degreasing, precision cleaning, cleaning of electronic circuits, dry cleaning, abrasive cleaning, solvents for the deposition of lubricants and release agents, and of other solvent or surface treatments.

EXAMPLES

The following examples illustrate the invention without limiting it.

Example 1

Azeotropic or Quasi-Azeotropic Compositions

A vacuum cell equipped with a sapphire tube is cooled to 5° C. with an oil bath. Once thermal equilibrium is reached, the cell is charged with HFO-1234yf, and the pressure at which the equilibrium is achieved is recorded. An amount of $NH_3$ is introduced into the cell, and the content is mixed in order to accelerate equilibration. At equilibrium, a minimal amount of sample is withdrawn from the gas phase and from the liquid phase for gas chromatography analysis with a thermal detector.

The equilibrium data obtained with various compositions of HFO-1234yf and $NH_3$ are represented in FIG. 1.

Example 2

Study of the Performances

The RK-Soave equation is used for calculating the densities, enthalpies, entropies and liquid/vapour equilibrium data of the mixtures. The use of this equation requires knowledge of the properties of the pure bodies used in the mixtures in question and also the interaction coefficients for each binary mixture.

The data available for each pure body are the boiling point, the critical temperature and the critical pressure, the curve of pressure as a function of the temperature starting from the boiling point up to the critical point, the saturated liquid and saturated vapour densities as a function of the temperature.

The data on ammonia are published in the ASHRAE Handbook 2005, chapter 20 and are also available from Refrop (software developed by NIST for calculating the properties of refrigerants).

The data of the temperature-pressure curve of HFO-1234yf are measured by the static method. The critical temperature and the critical pressure are measured using a C80 calorimeter sold by Setaram.

The RK-Soave equation uses binary interaction coefficients to represent the behavior of the products in mixtures. The coefficients are calculated as a function of the experimental liquid/vapour equilibrium data.

For evaluating the energy performances, a compression system equipped with an evaporator, a condenser, a compressor and an expansion valve is considered.

The coefficient of performance (COP) is defined as being the useful power supplied by the system over the power provided or consumed by the system.

The Lorenz coefficient of performance (COPLorenz) is a reference coefficient of performance. It is a function of temperatures and is used for comparing the COPs of various fluids.

The Lorenz coefficient of performance is defined as follows (the temperatures T are in K):

$$T_{average}^{condenser} = T_{inlet}^{condenser} - T_{outlet}^{condenser}$$

$$T_{average}^{evaporator} = T_{outlet}^{evaporator} - T_{inlet}^{evaporator}$$

The Lorenz COP in the case of conditioned air and refrigeration is:

$$COPlorenz = \frac{T_{average}^{evaporator}}{T_{average}^{condenser} - T_{average}^{evaporator}}$$

The Lorenz COP in the case of heating is:

$$COPlorenz = \frac{T_{average}^{condenser}}{T_{average}^{condenser} - T_{average}^{evaporator}}$$

For each composition, the coefficient of performance of the Lorenz cycle is calculated as a function of the corresponding temperatures.

In the tables which follow, "T" denotes the temperature, "P" denotes the pressure, "% CAP" denotes the volumetric capacity of the fluid relative to the reference fluid indicated on the first line, "% COP/COPLorenz" denotes the ratio of the COP of the system relative to the corresponding COP of the Lorenz cycle and "glide" denotes the temperature variation over the evaporator at constant pressure.

In order to evaluate the energy performances of the heat pump, a compression system equipped with an evaporator, condenser and internal exchanger, with a screw compressor and with an expansion valve is considered.

The system operates with 5° C. of overheat. The evaporation temperature is −5° C. and the condensation temperature is 50° C.

The results obtained are collated in Table 1 below.

TABLE 1

| | | | | | | | | | | | | | | |
|---|---|---|---|---|---|---|---|---|---|---|---|---|---|---|
| Heating at moderate temperature, energy performances |||||||||||||||
| % | | T evaporator inlet (°C.) | T compressor outlet (°C.) | T expansion valve inlet (°C.) | P evaporator (bar) | P condenser (bar) | Compression ratio (p/p) | Glide (evaporator) | Compressor efficiency | % CAP | % COP/COPLorenz | P liquid saturation | P vapour saturation | P difference (%) |
| HFO- | | | | | | | R410A | | | | | | | |
| 1234yf | NH₃ | −5 | 91 | 48.0 | 6.8 | 30.7 | 4.5 | 0.07 | 79.4 | 100 | 58 | 6.8 | 8.8 | 0 |
| 85 | 15 | −7 | 100 | 48.3 | 4.7 | 26.5 | 5.6 | 1.82 | 74.8 | 81 | 59 | 4.7 | 4.4 | 7 |
| 82 | 18 | −6 | 102 | 48.3 | 4.9 | 26.9 | 5.4 | 0.76 | 75.7 | 88 | 60 | 4.9 | 4.8 | 3 |
| 81 | 19 | −5 | 102 | 48.3 | 5.0 | 27.0 | 5.4 | 0.49 | 75.9 | 90 | 60 | 5.0 | 4.9 | 2 |
| 80 | 20 | −5 | 103 | 48.3 | 5.0 | 27.1 | 5.4 | 0.27 | 76.1 | 91 | 60 | 5.0 | 5.0 | 1 |
| 79 | 21 | −5 | 104 | 48.3 | 5.1 | 27.1 | 5.3 | 0.11 | 76.2 | 93 | 61 | 5.1 | 5.1 | 0 |
| 78 | 22 | −5 | 105 | 48.3 | 5.1 | 27.2 | 5.3 | 0.02 | 76.2 | 94 | 61 | 5.1 | 5.1 | 0 |
| 77 | 23 | −5 | 107 | 48.3 | 5.1 | 27.2 | 5.3 | 0.01 | 76.2 | 95 | 61 | 5.1 | 5.1 | 0 |
| 76 | 24 | −5 | 108 | 48.3 | 5.1 | 27.2 | 5.4 | 0.14 | 76.1 | 95 | 61 | 5.1 | 5.0 | 1 |
| 75 | 25 | −5 | 111 | 48.3 | 5.0 | 27.2 | 5.4 | 0.46 | 75.8 | 95 | 61 | 5.0 | 4.9 | 2 |
| 74 | 26 | −6 | 113 | 48.3 | 4.9 | 27.3 | 5.5 | 0.79 | 75.4 | 94 | 61 | 4.9 | 4.8 | 3 |
| 70 | 30 | −7 | 123 | 48.3 | 4.7 | 27.2 | 5.8 | 2.00 | 74.1 | 92 | 60 | 4.7 | 4.4 | 8 |
| 65 | 35 | −8 | 134 | 48.3 | 4.5 | 27.2 | 6.1 | 3.25 | 72.7 | 91 | 60 | 4.5 | 3.3 | 12 |
| 60 | 40 | −9 | 145 | 48.3 | 4.3 | 27.1 | 6.3 | 4.17 | 71.4 | 90 | 60 | 4.3 | 3.7 | 16 |
| 50 | 50 | −10 | 164 | 48.2 | 4.1 | 26.9 | 6.6 | 4.82 | 69.4 | 88 | 60 | 4.2 | 3.4 | 20 |
| 40 | 60 | −9 | 181 | 48.2 | 3.9 | 26.7 | 6.8 | 4.31 | 68.0 | 87 | 59 | 4.3 | 3.3 | 23 |
| 20 | 80 | −7 | 198 | 48.1 | 3.7 | 25.1 | 6.8 | 2.27 | 68.2 | 86 | 60 | 4.3 | 3.4 | 21 |
| 10 | 90 | −6 | 193 | 48.0 | 3.6 | 23.2 | 6.4 | 1.13 | 70.6 | 86 | 62 | 4.0 | 3.5 | 14 |

In order to evaluate the energy performances of refrigeration at moderate temperature, a compression system equipped with an evaporator, condenser and internal exchanger, with a screw compressor and with an expansion valve is considered.

The system operates with 5° C. of overheat. The evaporation temperature is −5° C. and the condensation temperature is 50° C.

The results obtained are collated in Table 2 below.

TABLE 2

Refrigeration at moderate temperature, energy performances

| % | | T evaporator inlet (° C.) | T compressor outlet (° C.) | T expansion valve inlet (° C.) | P evaporator (bar) | P condenser (bar) | Compression ratio (p/p) | Glide (evaporator) | Compressor efficiency | % CAP | % COP/COPLorenz | P liquid saturation | P vapour saturation | P difference (%) |
|---|---|---|---|---|---|---|---|---|---|---|---|---|---|---|
| HFO-1234yf | NH₃ | | | | | | | R404A | | | | | | |
| | | −5 | 69 | 48.1 | 5.1 | 23.1 | 4.5 | 0.35 | 79.4 | 100 | 47 | 5.1 | 5.0 | 2 |
| | | | | | | | | R410A | | | | | | |
| | | −5 | 91 | 48.0 | 6.8 | 30.7 | 4.5 | 0.07 | 79.4 | 151 | 50 | 6.8 | 6.8 | 0 |
| 85 | 15 | −7 | 100 | 48.3 | 4.7 | 26.5 | 5.6 | 1.82 | 74.8 | 122 | 50 | 4.7 | 4.4 | 7 |
| 82 | 18 | −6 | 102 | 48.3 | 4.9 | 26.9 | 5.4 | 0.76 | 75.7 | 132 | 51 | 4.9 | 4.8 | 3 |
| 81 | 19 | −5 | 102 | 48.3 | 5.0 | 27.0 | 5.4 | 0.49 | 75.9 | 135 | 52 | 5.0 | 4.9 | 2 |
| 80 | 20 | −5 | 103 | 48.3 | 5.0 | 27.1 | 5.4 | 0.27 | 76.1 | 138 | 52 | 5.0 | 5.0 | 1 |
| 79 | 21 | −5 | 104 | 48.3 | 5.1 | 27.1 | 5.3 | 0.11 | 76.2 | 140 | 53 | 5.1 | 5.1 | 0 |
| 78 | 22 | −5 | 105 | 48.3 | 5.1 | 27.2 | 5.3 | 0.02 | 76.2 | 142 | 53 | 5.1 | 5.1 | 0 |
| 77 | 23 | −5 | 107 | 48.3 | 5.1 | 27.2 | 5.3 | 0.01 | 76.2 | 143 | 53 | 5.1 | 5.1 | 0 |
| 76 | 24 | −5 | 108 | 48.3 | 5.1 | 27.2 | 5.4 | 0.14 | 76.1 | 144 | 53 | 5.1 | 5.0 | 1 |
| 75 | 25 | −5 | 111 | 48.3 | 5.0 | 27.2 | 5.4 | 0.46 | 75.8 | 143 | 53 | 5.0 | 4.9 | 2 |
| 74 | 26 | −6 | 113 | 48.3 | 4.9 | 27.3 | 5.5 | 0.79 | 75.4 | 142 | 52 | 4.9 | 4.8 | 3 |
| 70 | 30 | −7 | 123 | 48.3 | 4.7 | 27.2 | 5.8 | 2.00 | 74.1 | 140 | 52 | 4.7 | 4.4 | 8 |
| 65 | 35 | −8 | 134 | 48.3 | 4.5 | 27.2 | 6.1 | 3.25 | 72.7 | 137 | 51 | 4.5 | 3.9 | 12 |
| 60 | 40 | −9 | 145 | 48.3 | 4.3 | 27.1 | 6.3 | 4.17 | 71.4 | 135 | 51 | 4.3 | 3.7 | 16 |
| 50 | 50 | −10 | 164 | 48.2 | 4.1 | 26.9 | 6.6 | 4.82 | 69.4 | 133 | 51 | 4.2 | 3.4 | 20 |
| 40 | 60 | −9 | 181 | 48.2 | 3.9 | 26.7 | 6.8 | 4.31 | 68.0 | 132 | 50 | 4.3 | 3.3 | 23 |
| 20 | 80 | −7 | 198 | 48.1 | 3.7 | 25.1 | 6.8 | 2.27 | 68.2 | 131 | 51 | 4.3 | 3.4 | 21 |
| 10 | 90 | −6 | 193 | 48.0 | 3.6 | 23.2 | 6.4 | 1.13 | 70.6 | 130 | 53 | 4.0 | 3.5 | 14 |

In order to evaluate the energy performances in a low temperature refrigeration process, a compression system equipped with an evaporator, condenser and internal exchanger, with an expansion valve and with a compressor having an isentropic efficiency of 60% is considered.

The system operates with 15° C. of overheat. The evaporation temperature is −30° C. and the condensation temperature is 40° C.

The results obtained are collated in Table 3 below.

TABLE 3

Refrigeration at moderate temperature, energy performances

| % | | T evaporator inlet (° C.) | T compressor outlet (° C.) | T expansion valve inlet (° C.) | P evaporator (bar) | P condenser (bar) | Compression ratio (p/p) | Glide (evaporator) | % CAP | % COP/COPLorenz |
|---|---|---|---|---|---|---|---|---|---|---|
| HFO-1234yf | NH₃ | | | | | R404A | | | | |
| | | −30 | 93 | 33 | 2.0 | 18.3 | 9.0 | 0.46 | 100 | 36 |
| 95 | 5 | −33 | 119 | 34 | 1.2 | 17.5 | 14.2 | 3.21 | 72 | 38 |
| 90 | 10 | −33 | 134 | 34 | 1.5 | 19.6 | 13.3 | 2.94 | 90 | 38 |
| 85 | 15 | −31 | 145 | 35 | 1.7 | 20.6 | 12.3 | 1.19 | 108 | 39 |
| 82 | 18 | −30 | 152 | 35 | 1.8 | 20.8 | 11.8 | 0.30 | 116 | 40 |
| 81 | 19 | −30 | 154 | 35 | 1.8 | 20.9 | 11.8 | 0.11 | 118 | 40 |
| 80 | 20 | −30 | 156 | 35 | 1.8 | 20.9 | 11.7 | 0.01 | 120 | 40 |
| 79 | 21 | −30 | 159 | 35 | 1.8 | 21.0 | 11.8 | 0.08 | 121 | 40 |
| 78 | 22 | −30 | 163 | 35 | 1.8 | 21.0 | 12.0 | 0.38 | 120 | 40 |
| 77 | 23 | −31 | 167 | 35 | 1.7 | 21.0 | 12.2 | 0.68 | 119 | 40 |
| 76 | 24 | −31 | 171 | 35 | 1.7 | 21.0 | 12.4 | 0.98 | 118 | 40 |
| 75 | 25 | −31 | 174 | 35 | 1.7 | 21.0 | 12.5 | 1.27 | 117 | 40 |
| 74 | 26 | −32 | 178 | 35 | 1.7 | 21.0 | 12.7 | 1.54 | 117 | 40 |
| 70 | 30 | −33 | 192 | 35 | 1.6 | 21.0 | 13.3 | 2.51 | 114 | 40 |

TABLE 3-continued

Refrigeration at moderate temperature, energy performances

| % | | T evaporator inlet (° C.) | T compressor outlet (° C.) | T expansion valve inlet (° C.) | P evaporator (bar) | P condenser (bar) R404A | Compression ratio (p/p) | Glide (evaporator) | % CAP | % COP/ COPLorenz |
|---|---|---|---|---|---|---|---|---|---|---|
| HFO-1234yf | NH$_3$ | −30 | 93 | 33 | 2.0 | 18.3 | 9.0 | 0.46 | 100 | 36 |
| 65 | 35 | −33 | 208 | 35 | 1.5 | 21.0 | 13.9 | 3.41 | 112 | 41 |
| 60 | 40 | −34 | 222 | 35 | 1.4 | 20.9 | 14.5 | 3.90 | 110 | 41 |
| 50 | 50 | −34 | 249 | 35 | 1.4 | 20.8 | 15.2 | 3.93 | 108 | 41 |
| 40 | 60 | −33 | 271 | 34 | 1.3 | 20.6 | 15.8 | 3.33 | 107 | 41 |
| 30 | 70 | −33 | 290 | 34 | 1.3 | 20.3 | 15.9 | 2.51 | 106 | 41 |
| 20 | 80 | −32 | 303 | 34 | 1.2 | 19.4 | 15.6 | 1.65 | 106 | 42 |
| 10 | 90 | −31 | 207 | 34 | 1.2 | 17.9 | 14.7 | 0.81 | 105 | 42 |

The invention claimed is:

1. A refrigerant composition comprising:
optionally, an additive selected from the group consisting of surface active agents, stabilizers, tracers, fluorescent agents, odorants, and solubilizing agents;
optionally, a lubricant; and
an azeotrope-like composition, the azeotrope-like composition consisting of:
from 20 to 60 wt % ammonia; and
from 40 to 80 wt % HFO1234yf,
wherein the azeotrope-like composition, at constant temperature of 5° C., exhibits a pressure of the saturated liquid and a pressure of the saturated vapor which differ by 10% or less.

2. The refrigerant of claim 1, wherein the azeotrope-like composition consists of from 20 to 40 wt % ammonia and from 60 to 80 wt % HFO-1234yf.

3. The refrigerant of claim 1, wherein the refrigerant composition comprises the additive selected from the group consisting of surface active agents, stabilizers, tracers, fluorescent agents, odorants, and solubilizing agents.

4. The refrigerant of claim 3, wherein the refrigerant composition comprises the lubricant.

5. The refrigerant of claim 1, wherein the refrigerant composition comprises the lubricant.

6. A heat transfer fluid composition comprising:
optionally, an additive selected from the group consisting of surface active agents, stabilizers, tracers, fluorescent agents, odorants, and solubilizing agents;
optionally, a lubricant; and
an azeotrope-like composition, the azeotrope-like composition consisting of:
from 20 to 60 wt % ammonia; and
from 40 to 80 wt % HFO1234yf,
wherein the azeotrope-like composition, at constant temperature of 5° C., exhibits a pressure of the saturated liquid and a pressure of the saturated vapor which differ by 10% or less.

7. The heat transfer fluid composition of claim 6, wherein the azeotrope-like composition of consists of from 20 to 40 wt % ammonia and from 60 to 80 wt % HFO-1234yf.

8. The refrigerant of claim 6, wherein the refrigerant composition comprises the additive selected from the group consisting of surface active agents, stabilizers, tracers, fluorescent agents, odorants, and solubilizing agents.

9. The refrigerant of claim 8, wherein the refrigerant composition comprises the lubricant.

10. The refrigerant of claim 6, wherein the refrigerant composition comprises the lubricant.

11. A refrigerant composition comprising:
optionally, an additive selected from the group consisting of surface active agents, stabilizers, tracers, fluorescent agents, odorants, and solubilizing agents;
optionally, a lubricant; and
an azeotrope-like composition, the azeotrope-like composition consisting essentially of:
from 20 to 60 wt % ammonia; and
from 40 to 80 wt % HFO1234yf,
wherein the azeotrope-like composition, at constant temperature of 5° C., exhibits a pressure of the saturated liquid and a pressure of the saturated vapor which differ by 10% or less.

12. The refrigerant of claim 11, wherein the azeotrope-like composition consists essentially of from 20 to 40 wt % ammonia and from 60 to 80 wt % HFO-1234yf.

13. The refrigerant of claim 11, wherein the refrigerant composition comprises the additive selected from the group consisting of surface active agents, stabilizers, tracers, fluorescent agents, odorants, and solubilizing agents.

14. The refrigerant of claim 13, wherein the refrigerant composition comprises the lubricant.

15. The refrigerant of claim 11, wherein the refrigerant composition comprises the lubricant.

16. A heat transfer fluid composition comprising:
optionally, an additive selected from the group consisting of surface active agents, stabilizers, tracers, fluorescent agents, odorants, and solubilizing agents;
optionally, a lubricant; and
an azeotrope-like composition, the azeotrope-like composition consisting essentially of:
from 20 to 60 wt % ammonia; and
from 40 to 80 wt % HFO1234yf,
wherein the azeotrope-like composition, at constant temperature of 5° C., exhibits a pressure of the saturated liquid and a pressure of the saturated vapor which differ by 10% or less.

17. The heat transfer fluid composition of claim 16, wherein the azeotrope-like composition of consists essentially of from 20 to 40 wt % ammonia and from 60 to 80 wt % HFO-1234yf.

18. The refrigerant of claim 16, wherein the refrigerant composition comprises the additive selected from the group consisting of surface active agents, stabilizers, tracers, fluorescent agents, odorants, and solubilizing agents.

19. The refrigerant of claim 18, wherein the refrigerant composition comprises the lubricant.

20. The refrigerant of claim 16, wherein the refrigerant composition comprises the lubricant.

* * * * *